Patented May 15, 1951

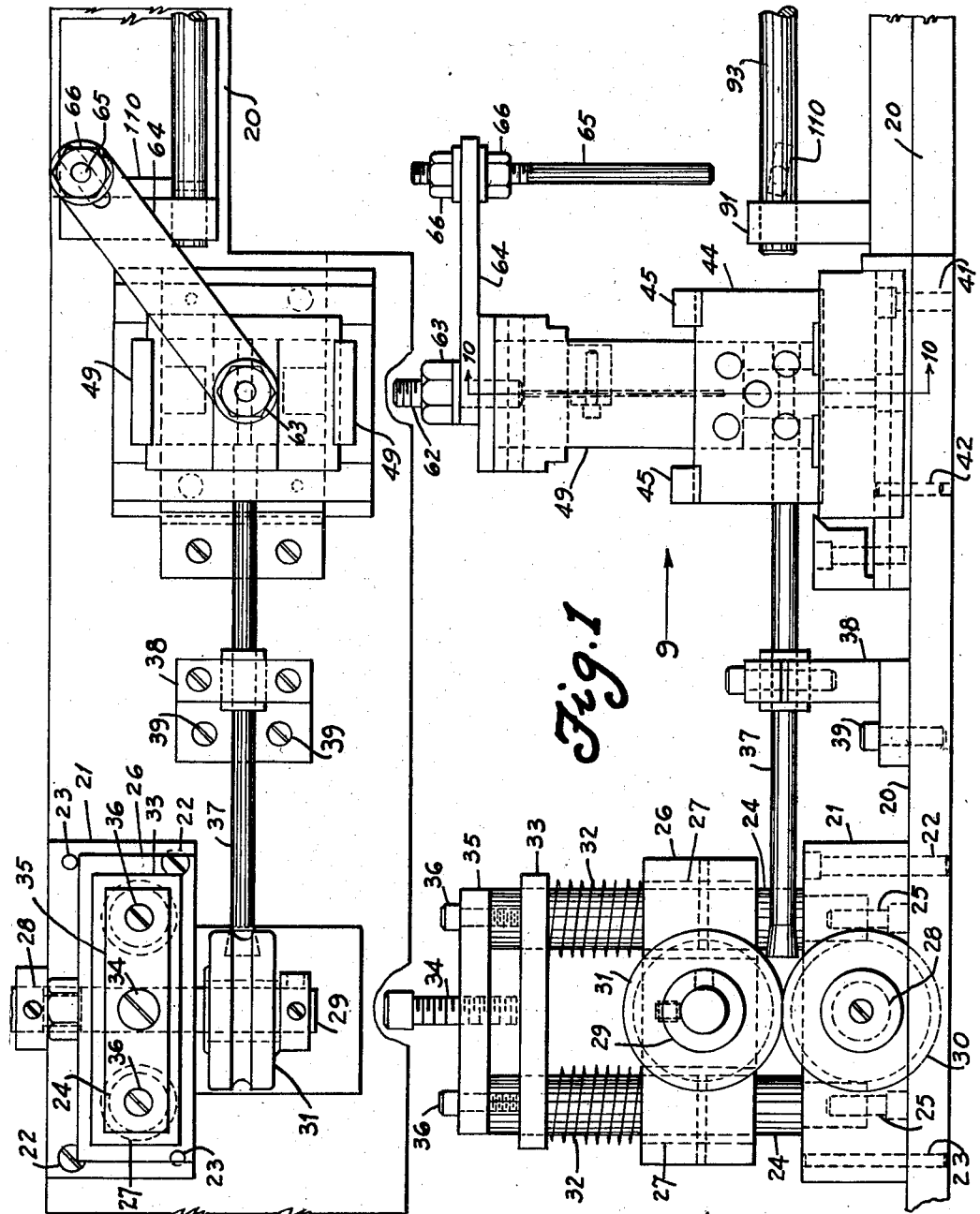

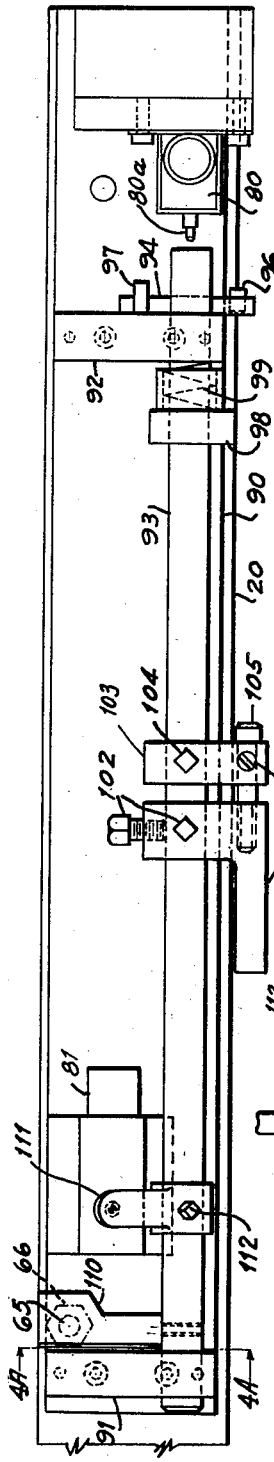
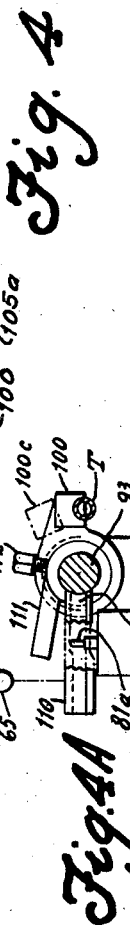
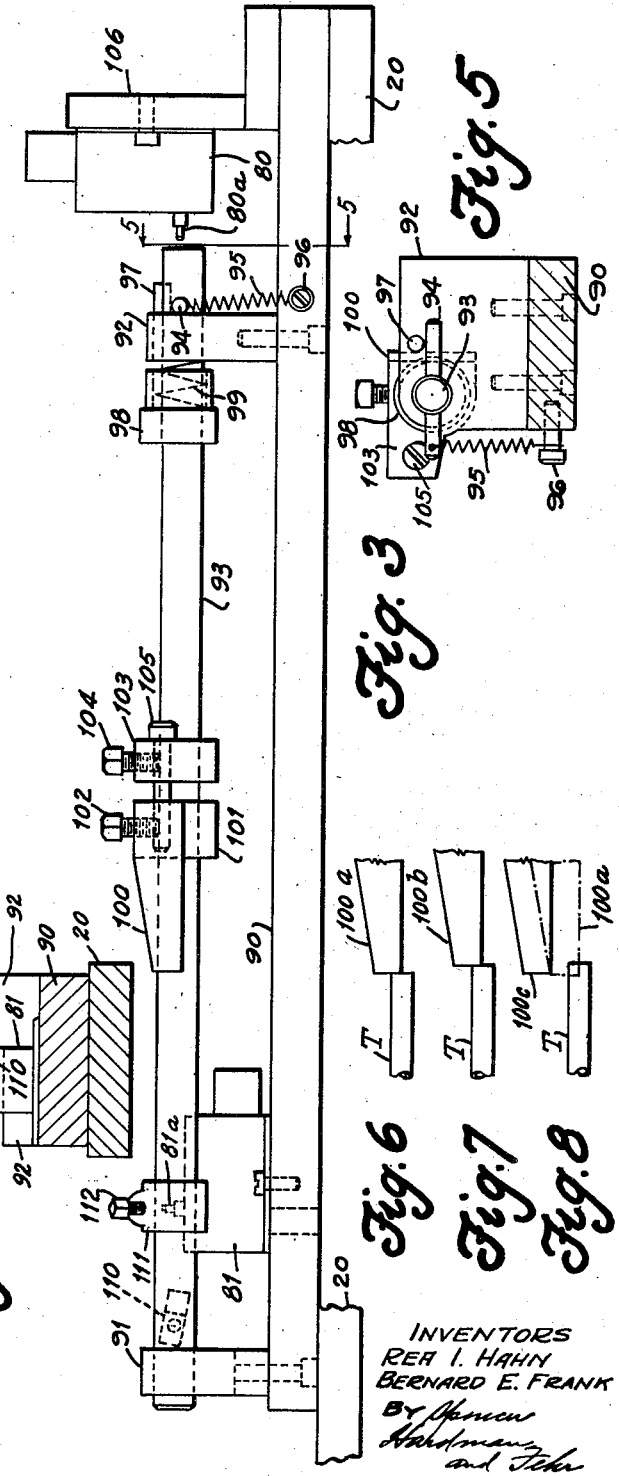

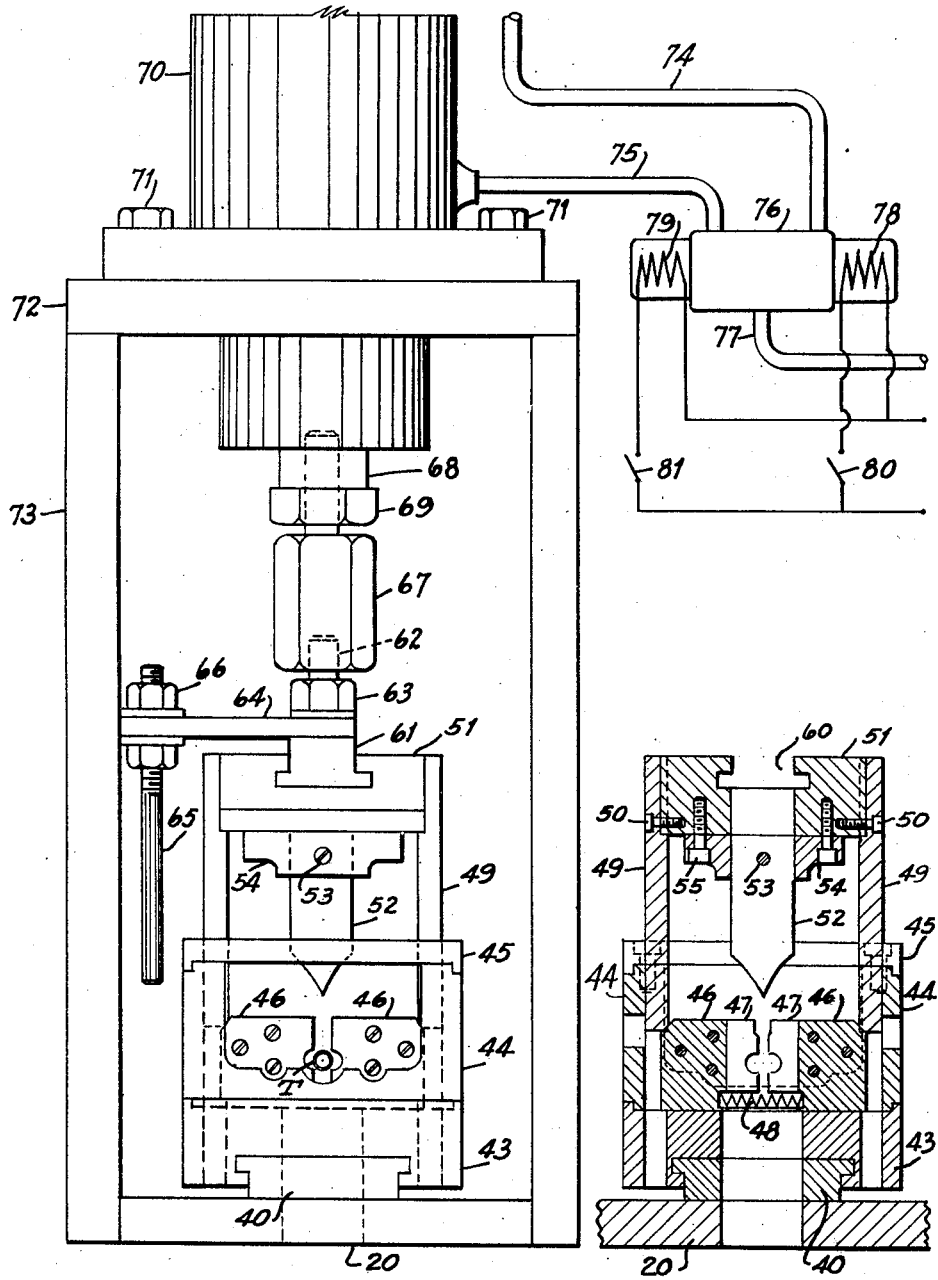

2,553,189

UNITED STATES PATENT OFFICE 2,553,189

APPARATUS FOR CUTTING TUBING

Rea I. Hahn and Bernard E. Frank, Rochester, N. Y., assignors to General Motors Corporation, Detroit, Mich., a corporation of Delaware Continuation of application Serial No. 38,956, July 16, 1948. This application February 3, 1950, Serial No. 142,261

3 Claims. (Cl. 164—49)

This application is a continuation of our copending application Serial No. 38,956, filed July 16, 1948.

This invention relates to apparatus for cutting tubing into lengths.

An object of the invention is to provide a machine which will automatically cut tubing into desired lengths without stopping operation of the feed mechanism. The tubing is fed through the cutter unit into engagement with a bar which is moved laterally by the tubing to effect the closing of an electric switch which causes the cutter to operate the bar to move to a position above the tubing whereupon a spring moves the bar laterally in a direction opposite to tubing movement in consequence of which the cut tubing is moved under the bar by the uncut tubing until the cut tubing clears the cutter unit whereupon it gravitates from the machine.

Further objects and advantages of the present invention will be apparent from the following description, reference being had to the accompanying drawings wherein a preferred embodiment of the present invention is clearly shown.

In the drawings:

Fig. 1 is a side view of the feeding and cutting devices of the machine;

Fig. 2 is a plan view thereof;

Fig. 3, which is a continuation of Fig. 1, is a front view of the means for automatically operating the cutter;

Fig. 4 is a plan view thereof;

Fig. 4A is a sectional view on line 4A—4A of Fig. 4;

Fig. 5 is a sectional view on line 5—5 of Fig. 3;

Figs. 6, 7 and 8 are diagrams showing position of lever 100 relative to tubing T;

Fig. 9 is a view in the direction of arrow 9 of Fig. 1 showing the cutter and means for operating it;

Fig. 10 is a sectional view of the cutter on line 10—10 of Fig. 1.

Referring to Figs. 1 and 2, a base plate 20 supports a tubing feeder unit comprising a block 21 attached thereto by screws 22 and located by dowels 23. Block 21 supports rods 24 attached thereto by screws 25. Rods 24 guide a block 26 having bearing bushings 27 which slide on the rods. Blocks 21 and 26 support shafts 28 and 29 respectively to which grooved feed rollers 30 and 31 respectively are attached. Shaft 28 is connected in any suitable manner with a source of mechanical power so that it will be rotated clockwise as viewed in Fig. 1. Roller 31 is urged toward roller 30 by springs 32 surrounding rods 24 and confined under pressure between blocks 26 and a plate 33 which is maintained in the desired position of adjustment by a screw 34 threaded through a plate 35 which screws 36 attach to the rods 24. Tubing is fed between rollers 30 and 31 to the right in Fig. 1 through a tube 37 supported by bracket 38 which screws 39 attach to the base 20.

Referring also to Figs. 9 and 10, the base 20 supports a guide plate 40 which screws 41 and dowels 42 connect with the base. Plate 40 supports a cutter unit comprising base block 43 which supports a frame comprising side plates 44 and top bars 45. This frame and base carry horizontally movable blocks 46 carrying two pairs of tubing gripping jaws 47. Springs 48 urge the blocks 46 against cam bars 49 which screws 50 attach to a block 51. A cutter blade 52 is attached by screws 53 to a plate 54 which screws 55 attach to the block 51. When block 51 is moved down by means to be described, to push the blade 52 through the tubing, the bars 49 cam the blocks 46 toward each other against the action of springs 48 to cause the pairs of jaws 47 to grip the tubing. These pairs of jaws are spaced apart the thickness of the blade which shears off a short section of the tubing and pushes it down through holes in the block 43, plate 40 and base 20.

The block 51 has a T-slot 60 for receiving a T-block 61 through which a screw 62 is threaded. Screws 62, together with nut 63 threaded thereon, secure a plate 64 to the block 61. Plate 64 supports a rod 65 having a threaded portion receiving nuts 66, the adjustment of which locates the lower end of the rod 65 at the desired elevation. Screw 62 is connected by a coupling 67 with rod 68 and the coupling 67 is located in the desired position of adjustment by a nut 69. Rod 68 is connected to a piston within a fluid pressure cylinder 70 which is attached by screws 71 to a plate 72 supported by plates 73 attached to base 20. Pipes 74 and 75, connected respectively with the upper and lower ends of the cylinder 70, are connected with a valve 76 having an inlet pipe 77 and an exhaust pipe not shown. The valve 76 is conditioned by electromagnets or solenoids 78 and 79 controlled respectively by switches 80 and 81 in a manner to be described.

The mechanism for automatically operating the switches 80 and 81 will now be described with reference to Figs. 3, 4 and 5. Plate 90 attached to base 20 supports brackets 91 and 92 which support a rotatable and axially movable shaft 93 carrying a pin 94 (Fig. 5) connected by a spring 95 with a screw 96 attached to base 90. Spring 95 urges the pin 94 against a stop 97, thereby locating the shaft 93 in a certain normal position. A collar 98, attached to the shaft 93, receives a spring 99 which urges the shaft 93 left so that the pin 94 normally engages the right side of the bracket 92. Thus the shaft 93 is located in a normal axial position. An abutment bar 100 is integral with hub 101 which can be clamped to the shaft 93 by screws 102. A bar 103 is attached by screw 104 to shaft 93 and supports a screw 105 passing through a plain hole in the bar 103 and threaded to the bar 100.

The length of the tubing which is cut off is dependent on the location of the bar 100 which the tubing strikes and causes right movement of the shaft 93 to engage the plunger 80a of switch 80 (supported by bracket 106, Fig. 3) thereby causing it to close, thereby energizing solenoid 78 (Fig. 6) which causes valve 76 to operate to connect pipes 77 and 74 so that the piston in cylinder 70 move down to cause the blade 52 to sever the tubing. During downward movement of the blade 52 the rod 65 engages a lever 110 attached to the shaft 93, thereby causing it to rotate clockwise (Fig. 5) and to cause the bar 100 to move up so that the cut tubing can pass under it. When the bar 100 is released from engagement with the tubing, the spring 99 pushes the shaft 93 toward the left to permit switch 80 to open.

Near the end of downward movement of the blade when shaft 93 is rotated to lift the stop bar 100, switch 81 is closed by the engagement of its plunger 81a (Fig. 3) by lever 111 which a screw 112 fixes to the shaft 93. The closing of switch 81 causes solenoid 79 to be energized thereby connecting pipes 77 and 75 so that the piston in cylinder 70 will rise and the cutter blade 52 will return to upper position. The cutter blade 52 is located in the path of movement of the tubing for a very brief instant during which the tubing stops while the feed rolls slip thereon. When the cutter blade 52 rises above the tubing movement thereof is resumed and it pushes the cut tubing under the bar 100. When the cut tubing has cleared the cutter unit it gravitates from the machine.

An important feature of the present invention is the endwise movable and rotatable stop bar 10 shown at 100a in Fig. 6, which the tubing T engages and moves to the right to position 100b shown in Fig. 7 to cause closing of switch 80 whereupon the bar is lifted near the end of downward movement of the cutter to a position above the tubing whereupon the bar is moved by spring 99 to the left and above the right end of the tubing as shown at 100c in Fig. 8. During upward movement of the cutter 52, the bar 100 returns by the action of spring 95 to normal position 100a preparatory to engagement by the end of the uncut tubing; and, during said return movement of the bar 100, it strikes the right end of the cut tubing to assist in ejecting the same. Therefore, the cut tubing can pass under the bar as it is moved by the uncut tubing to clear the cutter unit whereupon the cut tubing gravitates from the machine into a receptacle.

While the embodiment of the present invention as herein disclosed, constitutes a preferred form, it is to be understood that other forms might be adopted, all coming within the scope of the claims which follow.

What is claimed is as follows:

1. Apparatus for cutting tubing which is moved longitudinally by a feeding device, said apparatus comprising a tubing cutter movable transversely of the tubing, an abutment member located normally in the path of movement of the tubing, means supporting the member for movement with the tubing and supporting the member for movement laterally away from the tubing, a first spring which opposes movement of the member with the tubing, a second spring which opposes movement of the member laterally away from the tubing, a first device actuated by movement of the member with the tubing for causing advancement of the cutter to cut the tubing, means actuated in response to advancement of the cutter to move the member laterally away from the path of movement of the tubing, said first spring then being operative to move the member in a direction opposite to that of tubing movement and to release said first device, and a second device actuated during advancement of the cutter for causing retraction of the cutter and release of said second device in consequence of which the cut tubing is moved by the uncut tubing away from the cutter so that the cut tubing can gravitate from the path of movement of the uncut tubing and in consequence of which the second spring is released and to cause the abutment member to strike the cut tubing and thereby to assist in ejection thereof and to return to normal position in the path of movement of the uncut tubing.

2. Apparatus for cutting tubing which is moved longitudinally by a feeding device, said apparatus comprising a tubing cutter movable transversely of the tubing, a shaft located parallel to the tubing, means supporting the shaft for axial and rotary movements, an abutment member attached to the shaft and located normally in the path of movement of the tubing at a predetermined distance from the cutter, a first device actuated by movement of the shaft axially in response to movement of the abutment member by the tubing for causing advancement of the cutter to cut the tubing, means actuated in response to advancement of the cutter to effect rotation of the shaft to move the abutment member away from the tubing, a spring released for operation in response to said retraction of the abutment member to return the shaft to normal axial position and consequently the abutment member back to a position along side the cut tubing, said movement of the shaft releasing said first device, a second device actuated during advancement of the cutter for causing retraction of the cutter and release of said second device in consequence of which the cut tubing is moved by the uncut tubing away from the cutter so that the cut tubing can gravitate from the path of movement of the uncut tubing, and a spring for rotating the shaft back to its normal position thereby causing the member to strike the cut tubing to assist in ejection thereof and moving the abutment member into the path of movement of the uncut tubing.

3. Apparatus for cutting tubing which is moved longitudinally by a feeding device, said apparatus comprising a servomotor having a movable member, a tubing cutter operated by the member, a first and second servomotor controlling devices respectively for effecting movement of the cutter toward and away from the tubing, a shaft located parallel to the tubing, means supporting the shaft for axial and rotary movements, an abutment member attached to the shaft and located normally in the path of movement of the tubing at a predetermined distance from the cutter, the first control device having an actuator located in the path of axial movement of the shaft which is moved in response to movement of the abutment member by the tubing whereby the first control device is rendered operative by movement of the shaft to cause the servomotor member to move in the direction to cause the cutter to sever the tubing, means actuated by the servomotor member while moving in said direction for effecting rotation of the shaft to move the abutment member away from the tubing, a spring released for operation in response to said retraction of the abutment member to return the shaft to normal axial position and consequently the abutment member back to a position alongside the cut tubing, said movement of the shaft releasing the actuator of the first control device, means operated by said servomotor member during the latter portion of its movement in said direction for causing the second control device to be rendered effective to cause the servomotor member to move in the opposite direction to retract the cutter and to release the actuator of the second control device in consequence of which the cut tubing is moved by the uncut tubing away from the cutter so that the cut tubing can gravitate from the path of movement of the uncut tubing, and a spring for rotating the shaft back to its normal position thereby causing the member to strike the cut tubing to assist in ejection thereof and moving the member into normal position in the path of movement of the uncut tubing.

REA I. HAHN.
BERNARD E. FRANK.

No references cited.